Nov. 29, 1949   H. R. STRAIGHT   2,489,509
STEAM DISTILLATION APPARATUS FOR REMOVING SOLVENT
FROM VEGETABLE OIL WITH LESS BREAK
Filed May 10, 1946   2 Sheets-Sheet 2
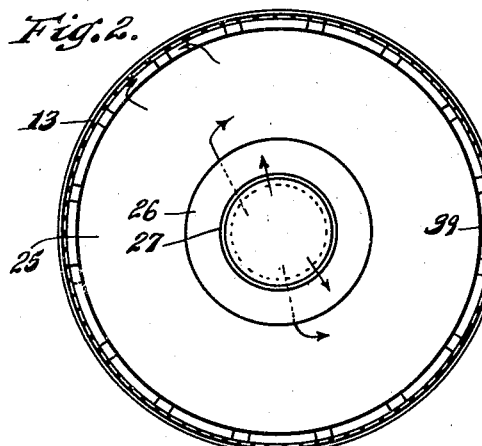
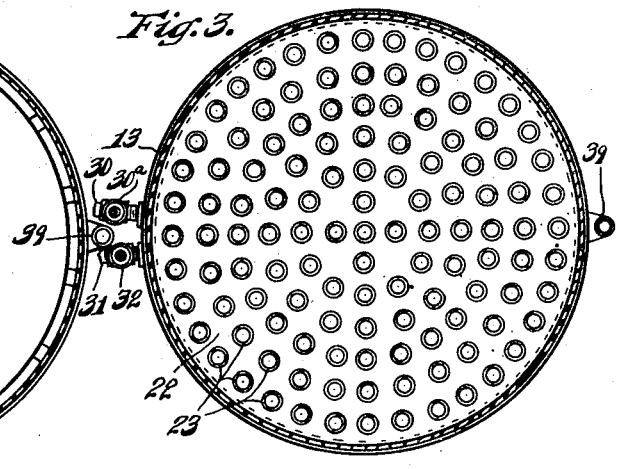
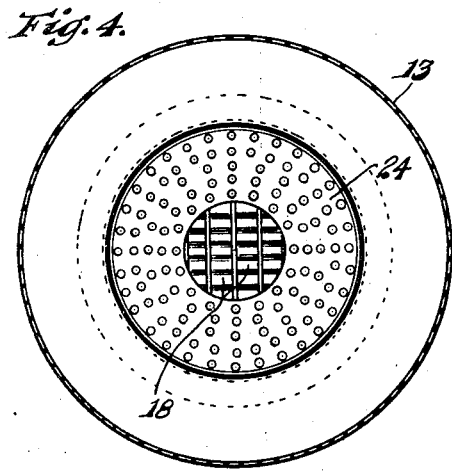
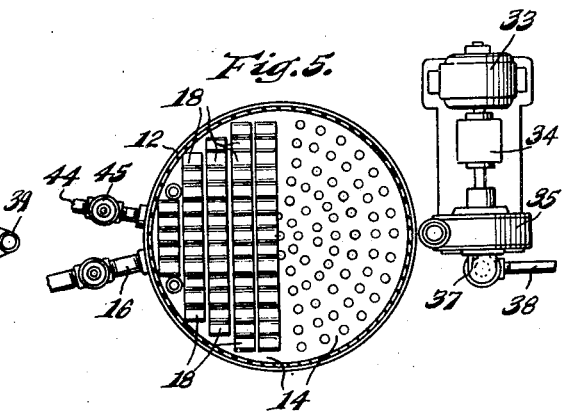
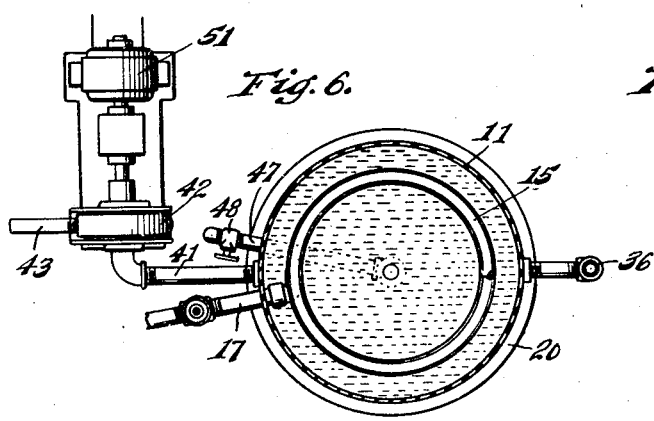
Inventor.
Halver R. Straight.
By Baird Freeman
Att'ys.

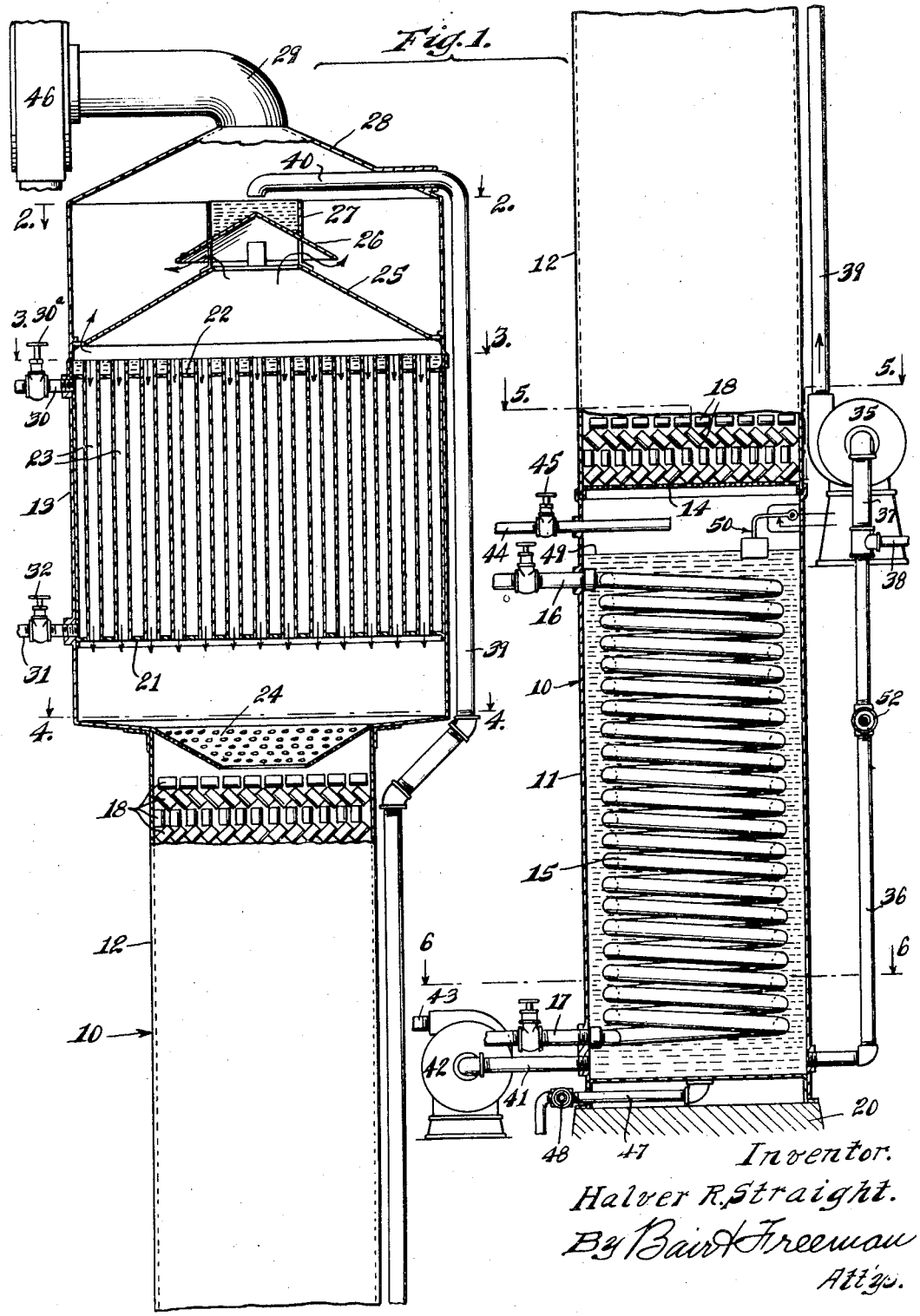

Patented Nov. 29, 1949

2,489,509

UNITED STATES PATENT OFFICE 2,489,509

STEAM DISTILLATION APPARATUS FOR REMOVING SOLVENT FROM VEGETABLE OIL WITH LESS BREAK

Halver R. Straight, Adel, Iowa

Application May 10, 1946, Serial No. 668,823

6 Claims. (Cl. 202—153)

When oil has been removed from soy beans or other oil-bearing seeds by the solvent process, it is the practice to put the miscella, oil and solvent through a process for separating the oil from the solvent. I propose to subject the oil to a treatment in a manner for removing more of the last traces of solvent, than has heretofore been possible. My present invention relates to this treatment.

In this final treatment, it is generally highly desirable to avoid "breaks," to-wit, a small complex reaction in which certain parts (for instance phosphitides) precipitate out from the oil.

It is therefore the purpose of my invention to provide a method and apparatus to remove more of the last traces of solvent from such oil with little or no "break" of the oil.

To that end I provide a tower having a lower section for containing oil and in which the oil may be heated. The lower section is separated from an upper section by a perforated partition. The upper section has a large body of Raschig rings or other elements thrown in indiscriminately for the purpose of dispersing the oil and affording a large surface area for oil films and for insuring that the oil will follow in an irregular path during the operation of the apparatus.

The oil containing some solvent is pumped from a source of supply, into the tower in some quantity and thereafter, by a continuous pumping operation, some of the oil in the tower is recirculated and some fresh oil is constantly supplied with recirculated oil to the top of the tower. In the top of the tower the oil is heated and dispersed and permitted to flow down in thin film and droplets under some vacuum over the Raschig rings through the perforated partition to the lower section.

Both the upper and lower sections of the tower are provided with heated means.

During operation, the oil in the lower section of the tower is maintained at a predetermined level by suitable means.

The steam is supplied to the tower just below the partition under low pressure but with as much superheat as possible. The oil film flowing down over the Raschig rings is in constant contact with an upwardly flowing current of steam. The solvent vapors and surplus steam are taken off at the top of the tower.

I find that when the oil is heated and circulated and partly recirculated over the rings through the upwardly flowing current of steam under partial vacuum in smaller quantities than usual, and at a higher rate of down-flow of the oil with its content of solvent, the solvent can be removed with little or no "break" of the oil. The vacuum lowers the boiling point of the combined oil-solvent liquid and the steam increases the vapor pressure of the oil-solvent liquid at each of its boiling points. The recirculation provides recurrent exposures of a large portion of the oil solvent liquid with the result that less steam need be provided to help free the oil of its last traces of solvent. In this way, the use of less steam results in less "break" precipitating out of the oil; and since the "break" is high in moisture, a better oil results from the standpoint of the oil refiner.

With these and other objects in view, my invention consists in the method, and in the construction, arrangement and combination of the various parts of my device, whereby the objects contemplated are attained, as hereinafter more fully set forth, pointed out in my claims and illustrated in the accompanying drawings, wherein:

Figure 1 is a vertical, sectional view through the apparatus embodying my invention and with which my method may be carried out. Because the tower may be 30 feet high, part of it is shown at one side and part at the other side of the figure;

Figure 2 is a horizontal, sectional view taken on the line 2—2 of Figure 1;

Figure 3 is a horizontal, sectional view taken on the line 3—3 of Figure 1 above the heating pipes and the downflow pipes in the top of the tower;

Figure 4 is a horizontal sectional view taken on the line 4—4 of Figure 1 illustrating the perforated pan through and over which the oil flows to the section having the Raschig rings;

Figure 5 is a horizontal sectional view taken on the line 5—5 of Figure 1 just above the perforated partition in the tower, and above the oil supply pump;

Figure 6 is a horizontal sectional view taken on the line 6—6 of Figure 1; and,

Figure 7 is a perspective view of one of the Raschig rings.

In the accompanying drawings, the numeral 10 indicates generally a tower which has a lower section 11, a middle section 12 and a top section 13. The tower may rest upon any suitable foundation 20. It will of course be understood that suitable insulation may be provided for retaining heat in the tower. The tower sections 11 and 12 are separated by a horizontal perforated partition 14 illustrated in Figures 1 and 5.

The top section 13 is of larger diameter than that of the sections 11 and 12. In the lower section 11 is a suitable heating coil 15 to receive steam from a pipe 16 and to discharge steam through a pipe 17.

In the section 12 is a large body of Raschig rings 18 thrown in "hit and miss." These are short porcelain cylinders. Other means might be provided for the purpose of these rings.

In the section 13 are vertically spaced partitions 21 and 22 forming, with the walls of the section, a steam chamber. A series of vertical pipes 23 extend through the partitions mentioned and are welded or otherwise secured thereto by watertight joints. The pipes 23 extend above the upper partition 22 for a short distance. At the bottom of the section 13 above the section 12 is a perforated pan 24 in the form of an inverted truncated cone open at the top and bottom.

Above the pipes 23 is supported a separator 25 in the form of a truncated cone, open at both ends, but otherwise imperforate. At its lower part the separator 25 is so mounted on the wall of the tower section 13 as to afford room for flow of oil downwardly around the outer edge of the separator.

Mounted on and spaced above the upper part of the separator 25 is a cone-shaped separator 26 which overhangs the opening in the top of the separator 25 and supports an upwardly projecting reservoir cylinder 27.

The tower has a closed dome-shaped top 28 from which leads a take-off pipe 29 for the outflow of solvent vapor and steam.

Steam may be furnished to the chamber between the partitions 21 and 22 through a pipe 30 in which is a suitable valve 30a. Steam is discharged from the bottom of that chamber through a pipe 31 in which is a control valve 32.

Suitably mounted alongside the tower is a motor 33 shown in Figure 5 connected by a suitable gear box and reduction gear 34 with a suction pump 35. A pipe 36 communicates with the lower part of the tower section 11 and extends upwardly and is connected by a pipe 37 with the intake end of the pump 35.

A supply pipe 38 connects with the pipes 36 and 37 at their junction. The pipe 36 may be a 1½ inch pipe and the pipe 38 may be a one-inch pipe and the pipe 37 may be slightly larger.

A pipe 39 leads from the discharge end of the pump 35, Figure 1, to the top of the tower and is provided with an inwardly extending section 40 for discharging miscella into the reservoir 27.

A take-off pipe 41 communicates with the tower close to the bottom of section 11 for carrying oil to a pump 42 through which the oil is discharged through the pipe 43 to suitable storage.

Steam under one-half to one pound pressure may be furnished to the top of section 11 just below the partition 14 through a pipe 44 in which is a valve 45. A suction blower 46 may be provided for drawing off vapors and steam through the pipe 29 and creating a partial vacuum in the upper portion of the tower.

A drain pipe 47 leads from the bottom of the section 11 of the tower and has a valve 48. After operation has been started and is underway, the oil level in section 11 is maintained at 49 Figure 1, above the heating coil 15 by means of a float control 50, shown diagrammatically, for starting and stopping a motor 51 for operating the pump 42 at proper times.

*Operation*

In operation the float control keeps the motor 51 and pump 42 inoperative until the oil reaches the level indicated at 49. By closing a valve 52 in the pipe 36 and starting the pump 35, miscella can be pumped through the pipe 38 to the top of the tower and will flow downwardly until it is above the level of the lower end of the pipe 36. Thereafter the valve 52 can be opened, and, after further operation of the pump 35, oil will reach the level 49. Thereafter some oil will be pumped to the tower through the pipe 38 and some oil will be circulated through the pipe 36 from the section 11. Whenever the oil gets above the level 49, the float control 50 starts the pump 42 by which oil is withdrawn from the tower until the level in section 11 gets down to 49. Thus the oil is furnished and recirculated in a continuous operation.

The oil pumped into the reservoir 27 in the section 13 above the parts 26 and 25 flows over the top thereof, thence down over the member 26 and 25 and collects on the partition 22 until the space around the projecting upper ends of the pipes 23 is filled, whereupon the oil will flow over the top edges of the pipes 23 downwardly into the lower part of section 13, thence through the pan 24 to the Raschig rings.

It will be seen that the oil is thoroughly dispersed in the top of section 13. It is supplied through the pipe 38 at a temperature of about 230° and is maintained in the section 11 at a temperature of about 230°. It is reheated to a somewhat higher temperature by means of the steam between the partitions 21 and 22. In flowing downwardly through the Raschig rings, it is in the form of film and droplets, all surfaces of which are subjected to the up-flowing steam entering through the pipe 44.

The suction blower 46 is such as to maintain some vacuum in the section 12. I find that by so doing the oil can be heated to a temperature which would not otherwise be possible without danger of "breaks" and the speed of the down-flow and the volume of the down-flow are so controlled that the solvent is separated from the oil and flows through the pipe 29 together with the surplus steam from the pipe 44.

I claim as my invention:

1. In an apparatus of the kind described, a tower having a perforated partition below its upper end providing a chamber for Raschig rings or the like above the partition, means for supplying hot oil containing solvent to the top of the tower, means comprising a closed heated chamber in the upper portion of the tower, above the first mentioned chamber, and a plurality of vertical tubes extending through said heated chamber and in open communication with the tower above and below said heated chamber, said tubes extending upwardly beyond the upper end of said closed chamber, means for supplying steam to the tower below the partition, and means for drawing off solvent vapor and steam from the top of the tower and maintaining a partial vacuum in the chambers.

2. In an apparatus of the kind described, a tower having a perforated partition below its upper end providing a chamber for Raschig rings or the like above the partition, means for supplying hot oil containing solvent to the top of the tower, means comprising a closed heated chamber in the upper portion of the tower, above the first mentioned chamber, and a plurality of vertical tubes extending through said heated chamber and in open communication with the tower above and below said heated chamber, said tubes extending upwardly beyond the upper end of said closed chamber, means for supplying steam to the tower below the partition, means for drawing off solvent vapor and steam from the top of the tower and maintaining a partial vacuum in the chamber, means below the partition for heating the concentrated oil-solvent admixture, and means for recirculating said concentrated admixture through the tower for further removal of the solvent from the admixture.

3. In an apparatus of the kind described, a tower, a perforated partition intermediate the upper and lower end of the tower, a plurality of Raschig rings supported by the partition, a closed heated chamber above the Raschig rings, a plurality of vertical tubes extending through the heated chamber and communicating with the tower above and below the heated chamber, the tubes extending upwardly beyond the upper end of the heated chamber, outwardly and downwardly directed deflecting baffles above the heated chamber, means for introducing liquid into the tower at the top thereof above said deflecting baffles, and means for withdrawing liquid from the tower at the bottom thereof.

4. In an apparatus of the kind described, a tower, a perforated partition intermediate the upper and lower end of the tower forming a collection chamber therebelow, a steam coil in the collection chamber, and adapted for connection with means for circulation of steam therethrough, a plurality of Raschig rings supported by the partition, a closed heated chamber above the Raschig rings, a plurality of vertical tubes extending through the heated chamber and communicating with the tower above and below the heated chamber, the tubes extending upwardly beyond the upper end of the heated chamber, an opening in the top of the tower for drawing off vapors, means for introducing liquid into the tower at the top thereof, and means for withdrawing liquid from the tower at the bottom thereof.

5. In an apparatus of the kind described, a tower, a perforated partition intermediate the upper and lower end of the tower forming a collection chamber therebelow, a steam coil in the collection chamber, and adapted for connection with means for circulation of steam therethrough, pump means operable for drawing off liquid from said collection chamber, float means in said collection chamber responsive to the level of liquid in the collection chamber for controlling the operation of said pump, a plurality of Raschig rings supported by the partition, a closed heated chamber above the Raschig rings, a plurality of vertical tubes extending through the heated chamber and communicating with the tower above and below the heated chamber, pump means operable for drawing off liquid from the collection chamber and delivering it to the top of the tower above said heated chamber, and an opening in the top of the tower for drawing off vapors.

6. In an apparatus of the kind described, a tower, a perforated partition intermediate the upper and lower end of the tower forming a collection chamber therebelow, a steam coil in the collection chamber and adapted for connection with means for circulation of steam therethrough, pump means operable for drawing off liquid from said collection chamber, float means in said collection chamber responsive to the level of liquid in the collection chamber for controlling the operation of said pump, a plurality of Raschig rings, supported by the partition, a closed heated chamber above the Raschig rings, a plurality of vertical tubes extending through the heated chamber and communicating with the tower above and below the heated chamber, pump means operable for drawing off liquid from the collection chamber and delivering it to the top of the tower above said heated chamber, said last named pump means having a connection with a source of liquid and adapted for mixing said liquid with the liquid from the collection chamber and delivering it to the top of the tower, and an opening in the top of the tower for drawing off vapors.

HALVER R. STRAIGHT.

REFERENCES CITED

The following references are of record in the file of this patent:

UNITED STATES PATENTS

| Number | Name | Date |
|---|---|---|
| 1,141,266 | Raschig | June 1, 1915 |
| 1,559,701 | Hirt | Nov. 3, 1925 |
| 1,775,154 | Boykin | Sept. 9, 1930 |
| 2,075,896 | Harmon | Apr. 6, 1937 |
| 2,163,303 | Bonotto | June 20, 1939 |
| 2,224,984 | Potts | Dec. 17, 1940 |
| 2,458,902 | Fitzhugh et al. | Jan. 11, 1949 |
| 2,467,435 | Langhurst | Apr. 19, 1949 |